April 10, 1956  LA RUE V. REGELMAN  2,741,714
DUAL ADJUSTMENT MAGNETIC SLIP BRAKE
Filed Nov. 29, 1954
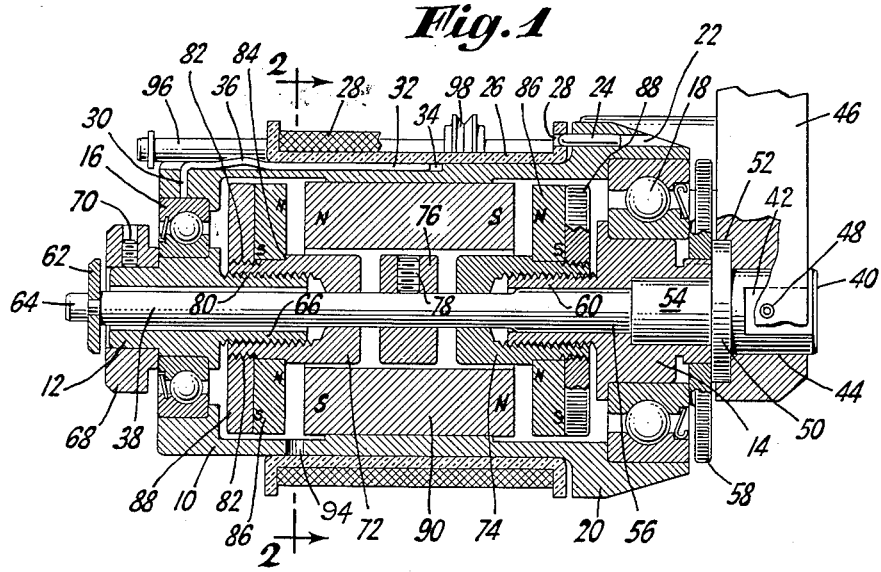
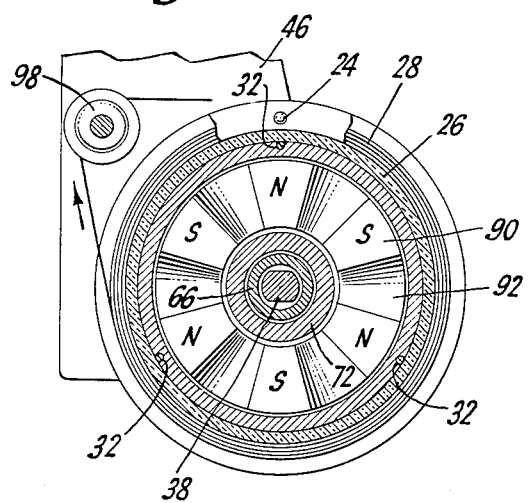
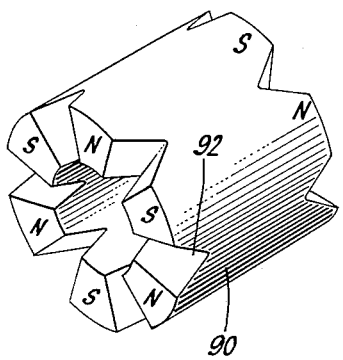
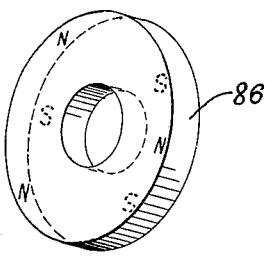
INVENTOR
LARUE V. REGELMAN
BY
*Michael Hertz*
ATTORNEY

«2,741,714»

DUAL ADJUSTMENT MAGNETIC SLIP BRAKE

La Rue V. Regelman, Emporium, Pa., assignor to Sylvania Electric Products Inc., a corporation of Massachusetts Application November 29, 1954, Serial No. 471,601

10 Claims. (Cl. 310—93)

The invention relates to a dual adjustment magnetic slip brake.

It is an object of the invention to make a brake of this character which shall be adapted to spooling or winding operations requiring accurate tension control.

It is a further object of the invention to provide a magnetic slip brake which shall have desirable characteristics at widely different operating speeds and to provide for extremely low to high tension ranges at any selected speed.

These and further objects will be apparent after reading the following specification and claims in conjunction with the accompanying drawings in which Fig. 1 is a central longitudinal cross section through a slip brake made in accordance with the invention.

Fig. 2 is a section on the line 2—2 thereof.

Fig. 3 is a perspective view of a double castellated magnet forming part of the brake and Fig. 4 is a perspective view of a disc magnet utilized in the brake with its polarities indicated thereon.

Referring to the drawings more in detail, there is provided a drum 10 made of a non-magnetic metal such as aluminum rotatable on a pair of non-magnetic collars 12 and 14 through the intermediary of a pair of ball bearings 16 and 18.

The drum has a cylindrical outer periphery with a flanged end 20 at the right, as viewed in Fig. 1. Within this end is an axial bore 22 frictionally retaining a pin 24 for locating circumferentially of the drum a flanged non-magnetic thimble 26 having a locating hole 28 engageable with the pin 24. A friction pad 28 of suitable plastic material such as nylon is secured around the thimble between the flanges. The pin constrains the thimble for rotation thereof with the drum. To prevent the thimble from slipping off the drum to the left, the drum is provided with a number of perforations 30 for frictionally retaining the bent ends of springs 32 which extend axially along the outer periphery of the drum within recessed portions 34 thereof and stressed to have the free ends move radially outwardly of the drum. Each spring is provided with a humped portion 36 adjacent the left hand end of thimble 26 thereby preventing shifting of the thimble to the left during normal operation of the brake.

The collars 12 and 14 support the inner raceways of the ball bearings and both encircle a stationary shaft 38. The stationary shaft has portions of different diameter and portions of it are flattened. The right hand portion is the thickest and includes a shaft attaching portion 40 with a flat 42 thereon to enable the shaft to be inserted into a bearing 44 of a support arm 46 adapted to be attached to a machine to which the brake apparatus is to be applied. A set screw 48 or the like holds the shaft in place in the bearing. The shaft at said right hand portion also includes a collar 50 to form a stop to limit insertion of the shaft into the arm and the arm may be recessed slightly as at 52 to accommodate the collar. The shaft is further provided with stepped, cylindrical portions 54 and 56 to mount the collar 14. The collar 14 has an internal cylindrical bore and may be rotated about the shaft by a knurled nut 58 of brass or other non-magnetic material. This nut is made fast with the collar in any suitable manner so that rotation of the nut will effect rotation of the collar. The collar has an elongated externally threaded cylindrical portion 60 surrounding the cylindrical portion of the shaft. To the left of this described portion, the shaft is flattened at top and bottom, as indicated in Figs. 1 and 2. A washer 62 is placed against the end of the shaft and a screw 64 threaded into the end of the shaft holds the washer in place.

The collar 12 at the left hand end of the shaft, like the collar 14, has a cylindrical bore and has an elongated externally threaded section 66. To rotate the collar, the same is provided with a knurled nut 68 and set screw 70 fastening the nut in the collar. Threaded on the elongated collar portions are a pair of non-magnetic pull-up nuts 72 and 74. These nuts have central openings conforming in size and shape to the cross section of the flattened portion of the shaft to confine the motion of the nuts to motion longitudinally of the shaft upon rotation of the collars 12 and 14. A non-magnetic stop block 76, held to the shaft by a set screw 78 prevents movement of the nuts too far toward the center of the shaft for a reason to be set forth. Each of the nuts is provided with an internal thread 80 engaging the external threads on the collars, an external thread 82 and a shoulder 84. Non-rotationally mounted on each of the nuts is an annular disc or ring magnet 86 and a soft steel keeper nut 88. The keeper nuts are drawn up so as to firmly hold the nuts and ring magnets against rotation on the pull up nuts 72 and 74. The disc magnets are polarized in such a manner that one circular face is all of one polarity and the opposite face of the disc is all of the opposite polarity. However, each face presents three distinct poles of like polarity substantially 120° apart, the poles on one face being midway between the poles on the other face, so that the distance between any two adjacent unlike poles is about 60°. They are preferably located on the pull-up nuts so that poles of opposite polarity face each other.

In between the ring magnets and frictionally retained by the rotatable drum 10 is the castellated magnet 90. This magnet is a hollow cylinder with thick walls and castellated ends. Each castellated end consists of an even number of equally spaced pole pieces, with the pole pieces on one end, on a line parallel to the axis of the mount opposite the pole pieces on the other end, the pole pieces at each end being separated from one another by V slots 92 of a depth substantially ¼ of the axial length of the cylinder. The pole pieces at each end of the cylinder are magnetized so that they alternate with one another and any pole piece at one end of the cylinder on a directrix is of opposite polarity to the pole piece at the other end thereof. The magnets may be of the "Alnico V" type. As a result of the polarization of magnet 90 and discs 86 loops of magnetic flux are formed so that as the magnet 90 is revolved there are three distinct points of drag on the magnet imposed by the system.

To assist in locating the magnet 90 in its proper position axially of the drum, a locating hole 94 is provided in the drum through which a suitable probe or gauge pin may be inserted to determine the position of magnet 90 in the drum. The stop block 76 is of such width as to contact the nuts 72 and 74 while there is still a desired clearance, as .003" to .005", between the ring magnets 86 and the cylinder magnet 90. In practice it has been found that if a certain minimum clearance is not provided an operator in adjusting the device will override the maximum torque effect position of the magnet assembly. When the knurled nuts 58 and 68 are turned, the disc or ring magnets 86 may be moved toward and from the magnet 90 thereby varying the torque applied to the drum 10, but the torque increases very gradually as the magnet rings are brought closer to the magnet 90 until a maximum is reached. That position is when the rings are close to but not in contact with the magnet 90. As the rings are brought still closer beyond the critical position, the torque drops off very rapidly. Therefore, the stop block is inserted in the assembly to limit the movement of the ring magnets inwardly to their maximum torque position, lesser torque being obtainable by moving the ring magnets away from magnet 90.

The support arm 46 is designed to carry a rod 96 on which is rotatably mounted a wire guide pulley 98.

In use a wire whose tension it is desired to regulate is passed around the padded portion of the drum and over the guide pulley to the wire receiving equipment. In moving the wire longitudinally of itself, it will rotate the drum, the rotation of the drum being resisted by the torque action of the magnets. A desired torque condition for the particular wire being tensioned may be attained by adjusting first one of the knurled nuts to vary the air gap between the one ring magnet and the castellated magnet, and then, if optimum results are not obtained, by adjusting the second knurled nut to vary the air gap of the corresponding magnet pair.

Having thus described my invention, what I claim as new is:

1. A magnetic brake comprising a drum, an annular magnetic member rotatable with the drum and arranged with the axis of the annulus concentric with the axis of the drum, said member presenting at an end thereof which lies in a plane perpendicular to the axis a series of alternating poles, the poles being arranged circularly about the axis, a disc magnet fixed against rotation mounted opposite said poles with one face of said disc exhibiting one polarity and the opposite face of the disc exhibiting the opposite polarity, and means for adjusting said disc magnet toward and from the annular magnetic member.

2. A magnetic brake comprising a drum, an annular magnetic member rotatable with the drum and arranged with the axis of the annulus concentric with the axis of the drum, said member presenting an end thereof which lies in a plane perpendicular to the axis a series of alternating poles, the poles being arranged circularly about the axis, a disc magnet fixed against rotation mounted opposite said poles with one face of said disc exhibiting one polarity and the opposite face of the disc exhibiting the opposite polarity, a soft steel keeper backing said disc magnet, and means for adjusting said disc magnet and keeper as a unit toward and from the annular magnetic member.

3. A magnetic brake comprising a drum, an annular magnet rotatable with the drum and arranged with the axis of the magnet concentric with the axis of the drum, said member presenting at each end thereof and which lies in planes perpendicular to the axis a series of alternating poles, the poles being arranged circularly about the axis, a disc magnet fixed against rotation mounted opposite said poles at each end of said magnet with one face of said disc exhibiting one polarity and the opposite face of the disc presenting the opposite polarity, a soft steel keeper disc backing each disc magnet, and means for adjusting each said disc magnet and associated keeper disc as a unit toward and from the annular magnet.

4. A magnetic brake comprising a drum, an annular magnet rotatable with the drum and arranged with the axis of the magnet concentric with the axis of the drum, said member presenting at an end thereof which lies in a plane perpendicular to the axis a series of alternating poles, the poles being arranged circularly about the axis, each pole being separated from an adjoining pole by a V-shaped slot, a disc magnet fixed against rotation mounted opposite said poles with one pole on one face of said disc exhibiting one polarity and the opposite face of the disc exhibiting the opposite polarity, a soft steel keeper disc backing the disc magnet, and means for adjusting said disc magnet and keeper disc as a unit toward and from the annular magnet.

5. A magnetic brake comprising a drum, an annular magnet rotatable with the drum and arranged with the axis of the magnet concentric with the axis of the drum, said magnet presenting at both ends thereof and which ends lie in planes perpendicular to the axis a series of alternating poles, with the poles arranged circularly about the axis, the polarity of said poles at opposite ends of the magnet on a line parallel to the axis being of opposite sense, a second magnet in the form of a disc fixed against rotation mounted opposite one end of the annular magnet, said disc magnet being polarized so that one face of the disc magnet exhibits one polarity and the opposite face of the disc presents the other polarity, a third magnet in the form of a disc and with poles as described in conjunction with the second disc magnet fixed against rotation and positioned opposite the other end of the annular magnet, and means for adjusting the disc magnets toward and from the ends of the annular magnet.

6. A magnetic brake comprising a drum, an annular magnet rotatable with the drum and arranged with the axis of the magnet concentric with the axis of the drum, said magnet presenting at both ends thereof and which ends lie in planes perpendicular to the axis a series of alternating poles, with the poles arranged circularly about the axis, the polarity of said poles at opposite ends of the magnet, on a line parallel to the axis, being of opposite sense, a second magnet in the form of a disc fixed against rotation mounted opposite one end of the annular magnet, said disc magnet being polarized so that one face of the disc magnet presents one polarity and the other face of the disc presents the opposite polarity, a third magnet in the form of a disc and with poles as described in conjunction with the second disc magnet fixed against rotation and positioned opposite the other end of the annular magnet, and means, individual to each disc magnet for adjusting them independently of each other toward and from the ends of the annular magnet.

7. A magnetic brake comprising a drum, an annular magnet rotatable with the drum and arranged with the axis of the magnet concentric with the axis of the drum, said magnet presenting at both ends thereof and which ends lie in planes perpendicular to the axis a series of alternating poles, with the poles arranged circularly about the axis, the polarity of said poles at opposite ends of the magnet, on a line parallel to the axis, being of opposite sense, a second magnet in the form of a disc fixed against rotation mounted opposite one end of the annular magnet, said disc magnet being polarized so that one face of the disc magnet exhibits one polarity and the other face of the disc presents the opposite polarity, a third magnet in the form of a disc and with poles as described in conjunction with the second disc magnet fixed against rotation and positioned opposite the other end of the annular magnet, a soft steel keeper disc backing each of the disc magnets, and means for adjusting the disc magnets toward and from the ends of the annular magnet.

8. In a magnetic brake, a support shaft having a flat portion thereon parallel with the axis of the shaft, a drum supported by and rotatable on said shaft, an annular magnet fixed for rotation with said drum, a second magnet fixed against rotation but movable toward and from the end of said annular magnet, and means for moving said second magnet comprising a rotatable threaded element on the shaft, a nut engaging the threads of said threaded element, means on the nut configurated to engage the flat portion of the shaft so as to limit the motion of the nut solely to longitudinal motion parallel to the axis of the shaft, and means on the nut to rigidly mount the second magnet thereon.

9. In a magnetic brake, a support shaft having a flat portion thereon parallel with the axis of the shaft, a drum supported by and rotatable on said shaft, an annular magnet fixed for rotation with said drum, a threaded element rotatively mounted on said shaft, means to facilitate manual rotation of the element, a nut engaging the threads of said threaded element, means on the nut configurated to engage the flat portion of the shaft so as to limit the motion of the nut solely to motion longitudinally of the shaft, said nut on its peripheral portion having a shoulder and a threaded end, a disc magnet surrounding the nut and mounted against said shoulder and a soft iron keeper threaded on the nut and rigidly holding the disc magnet and nut together.

10. In a magnetic brake, a support shaft having a flat portion thereon parallel with the axis of the shaft, a drum supported by and rotatable on said shaft, an annular magnet fixed for rotation with said drum, a threaded element rotatively mounted on said shaft, means to facilitate manual rotation of the element, a nut engaging the threads of said threaded element, means on the nut configurated to engage the flat portion of the shaft so as to limit the motion of the nut solely to motion longitudinally of the shaft, said nut on its peripheral portion having a shoulder and a threaded end, a disc magnet surrounding the nut and mounted against said shoulder, a soft iron keeper threaded on the nut and rigidly holding the disc magnet and nut together, and a stop on said shaft engageable with said nut to limit movement of the disc magnet toward the annular magnet to a position short of contact therewith.

References Cited in the file of this patent

UNITED STATES PATENTS

| | | |
|---|---|---|
| 2,361,239 | Ransom | Oct. 24, 1944 |
| 2,507,599 | Johnson | May 16, 1950 |
| 2,566,743 | Okulitch | Sept. 4, 1951 |
| 2,696,655 | Brabander | Dec. 14, 1954 |

FOREIGN PATENTS

| | | |
|---|---|---|
| 693,975 | Germany | July 23, 1940 |